United States Patent
Ishikawa

(10) Patent No.: US 11,634,538 B2
(45) Date of Patent: Apr. 25, 2023

(54) POLYCARBONATE RESIN AND METHOD FOR PRODUCING SAME

(71) Applicant: MITSUBISHI GAS CHEMICAL COMPANY, INC., Tokyo (JP)

(72) Inventor: Shun Ishikawa, Ibaraki (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 238 days.

(21) Appl. No.: 17/262,277

(22) PCT Filed: Jul. 17, 2019

(86) PCT No.: PCT/JP2019/027995
§ 371 (c)(1),
(2) Date: Jan. 22, 2021

(87) PCT Pub. No.: WO2020/022130
PCT Pub. Date: Jan. 30, 2020

(65) Prior Publication Data
US 2021/0317264 A1 Oct. 14, 2021

(30) Foreign Application Priority Data

Jul. 26, 2018 (JP) .............. JP2018-140493

(51) Int. Cl.
*C08G 64/06* (2006.01)
*C08G 64/24* (2006.01)

(52) U.S. Cl.
CPC ............. *C08G 64/06* (2013.01); *C08G 64/24* (2013.01)

(58) Field of Classification Search
CPC ....... C08G 64/04; C08G 64/24; C08G 64/226
See application file for complete search history.

(56) References Cited

U.S. PATENT DOCUMENTS

| 5,426,170 A | 6/1995 | Hirao et al. |
| 5,508,375 A * | 4/1996 | Hucks ............... G11B 7/2534 526/71 |
| 5,747,632 A | 5/1998 | Adachi et al. |
| 2010/0092212 A1 | 4/2010 | Ogawa et al. |

FOREIGN PATENT DOCUMENTS

| EP | 600447 A2 * | 6/1994 | ............. C08G 64/14 |
| JP | 06-336522 A | 12/1994 | |
| JP | 07-165899 A | 6/1995 | |
| JP | 2002-069168 A | 3/2002 | |
| JP | 2002-105190 A | 4/2002 | |
| JP | 2008-063501 A | 3/2008 | |
| JP | 2010-126605 A | 6/2010 | |
| JP | 2010-189629 A | 9/2010 | |
| WO | 2008/018467 A1 | 2/2008 | |

OTHER PUBLICATIONS

International Search Report issued in International Patent Application No. PCT/JP2019/027995, dated Sep. 17, 2019, along with an English translation thereof.
Written Opinion of the International Searching Authority issued in International Patent. Application No. PCT/JP2019/027995, dated Sep. 17, 2019, along with an English translation thereof.

* cited by examiner

*Primary Examiner* — David J Buttner
*Assistant Examiner* — Surbhi M Du
(74) *Attorney, Agent, or Firm* — Greenblum & Bernstein, P.L.C.

(57) ABSTRACT

The purpose of the present invention is to provide: a polycarbonate resin which has a narrow molecular weight distribution and in which the formation of low molecular weight oligomers is suppressed; and a method for producing the polycarbonate resin.
According to the present invention, provided are a polycarbonate resin containing a structural unit represented by general formula (1), wherein the molecular weight distribution value (Mw/Mn) is 6.0 or less, and the content of oligomers having a molecular weight of less than 1,000 is suppressed to 0.50 mass % or less; and a method for producing the polycarbonate. (In general formula (1), $R_{1-26}$ represent hydrogen, fluorine, chlorine, bromine, iodine, a C1-9 alkyl group, a C6-12 aryl group, a C1-5 alkoxy group, a C2-5 alkenyl group, or a C7-17 aralkyl group).

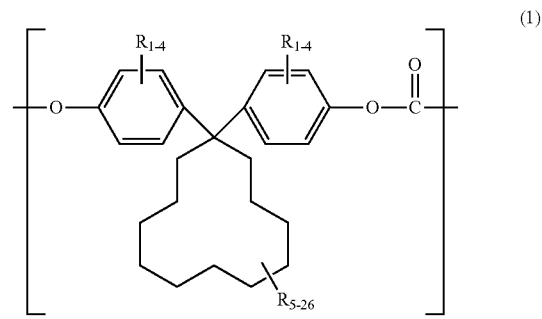

(1)

2 Claims, No Drawings

POLYCARBONATE RESIN AND METHOD FOR PRODUCING SAME

FIELD OF THE INVENTION

The present invention relates to a polycarbonate resin which has a narrow molecular weight distribution and in which formation of low-molecular weight oligomers is suppressed, and to a method for producing the same.

BACKGROUND ART

Polycarbonate resins are widely used for production of various molded articles. For example, substrates of optical recording media such as optical discs and magneto-optical discs are primarily produced by injection molding of a polycarbonate resin. Injection molding of such precision products requires volatile oligomers originating from polycarbonate attached to a stamper and a mold to be less.

As a method for producing a polycarbonate resin while suppressing formation of a volatile oligomer, for example, Patent document 1 discloses a method for producing a polycarbonate resin by carrying out interfacial polycondensation using, as a starting material, a polycarbonate oligomer having a viscosity average molecular weight (Mv) of 5,000 or less resulting from reaction between a carbonate as a raw material and a dihydroxy compound, and using an amine having basicity such that pKa as a hydrochloride salt is 10 or less as a catalyst in the absence of a terminating agent.

The production method of Patent document 1 is characterized in that it does not use a terminating agent. According to Patent document 1, although terminating agents are convenient for facilitating control of the reaction, when polymerization is carried out in the presence of a terminating agent, the terminally sealed molecules stop growing and thus growth of the molecules varies, which inevitably widens the molecular weight distribution. Therefore, Patent document 1 proposes a method for producing a polycarbonate resin by setting conditions that facilitate control of the reaction even without a terminal sealing agent so that the molecules can grow uniformly since the end of the molecule is not sealed.

In most of the current cases, however, polycarbonate resins are produced by using a terminating agent. Hence, there has been a need for establishment of a technique for producing a polycarbonate resin having an extremely narrow molecular weight distribution while suppressing formation of low-molecular weight oligomers even in the presence of a terminating agent.

In response to such a need, Patent document 2 discloses a method for producing an aromatic polycarbonate that contains a small amount of low-molecular weight oligomers, the method comprising:

(A) carrying out interfacial polymerization reaction in a reaction system containing an aromatic dihydroxy compound, a carbonate precursor, a base of an alkali metal or an alkaline earth metal, water and an organic solvent, in the absence of an end-capping agent; and (B) then, adding an end-capping agent once at least one of (1)-(3) below reaches a predetermined quantity:

(1) the weight average molecular weight of the prepolymer obtained in Step A;

(2) the remaining amount of the aromatic dihydroxy compound contained in the reaction mixture obtained in Step A; or (3) the amount of the bishaloformate compound which is derived from the dihydroxy compound and contained in the reaction mixture obtained in Step A with respect to the prepolymer.

The method of Patent document 2, however, requires a measurement such as gel permeation chromatography (GPC) or high performance liquid chromatography (HPLC) that uses an instrument during the process of production in order to confirm the timing for adding the terminating agent, and thus is disadvantageous in that the operation is complicated.

PRIOR ART DOCUMENTS

Patent Documents

Patent document 1: Japanese Unexamined Patent Application Publication No. 2002-069168

Patent document 2: Japanese Unexamined Patent Application Publication No. Heisei 06-336522

SUMMARY OF INVENTION

Problem to be Solved by Invention

The objective of the present invention is to provide a polycarbonate resin which has a narrow molecular weight distribution and in which formation of low-molecular weight oligomers is suppressed, and to provide a method for producing the same.

Means for Solving the Problem

The present invention provides a polycarbonate resin comprising a structural unit represented by general formula (1) below, wherein a molecular weight distribution value (Mw/Mn) is 6.0 or less and a content of oligomers having a molecular weight of less than 1,000 is 0.50 mass % or less:

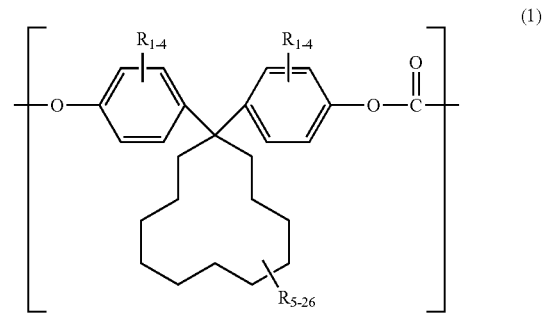

where, $R_{1-26}$ represent hydrogen, fluorine, chlorine, bromine, iodine, a C1-9 alkyl group, a C6-12 aryl group, a C1-5 alkoxy group, a C2-5 alkenyl group or a C7-17 aralkyl group.

In the polycarbonate resin of the present invention, $R_{1-26}$ in general formula (1) above are preferably hydrogen.

In addition, the present invention provides a method for producing the above-described polycarbonate resin, the method comprising the step of mixing a diol compound represented by general formula (2) below and a nitrogen-containing compound represented by general formula (3) below:

(2)

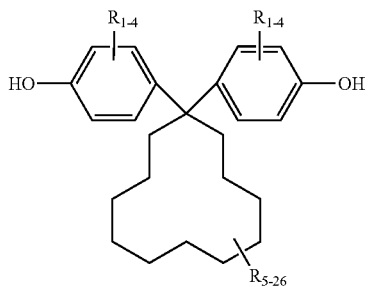

where, $R_{1-26}$ represent the same as in general formula (1) above; and (3)

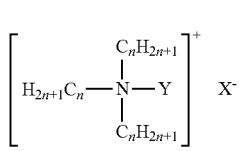

where, n represents any one of 2, 3 and 4, Y represents an ethyl group, a propyl group, a butyl group or a benzyl group, and X represents Cl, Br, OH or $HSO_4$.

Preferably, in the production method of the present invention, (1) the nitrogen-containing compound is mixed in an amount of less than 0.10 mass % relative to the diol compound; or (2) an organic solvent and a molecular weight control agent are added to and emulsified with a reaction solution containing the diol compound, the nitrogen-containing compound and phosgene, where the emulsification time is, in particular, shorter than 15 minutes.

Effects of Invention

A polycarbonate resin of the present invention has a molecular weight distribution value, which is represented by a ratio of the weight average molecular weight (Mw) and the number average molecular weight (Mn) (Mw/Mn), as small as 6.0 or less, and contains oligomers having a molecular weight of less than 1,000 at 0.50 mass % or less. Therefore, the polycarbonate resin of the present invention is less likely to cause volatilization originating from the oligomers upon heating, and thus forms small amount of mold fouling upon injection molding.

Furthermore, the method for producing a polycarbonate resin of the present invention is characterized in that a specific nitrogen-containing compound that can serve as a phase-transfer catalyst is mixed with a diol compound, and in that, in a preferable aspect, the amount of the nitrogen-containing compound used is small and time for emulsifying a reaction solution containing the diol compound, the nitrogen-containing compound and phosgene after adding an organic solvent and a molecular weight control agent is short. According to the production method of the present invention having such characteristics, a polycarbonate resin in which the molecules are uniformly grown and formation of oligomers having a molecular weight of less than 1,000 is suppressed, can be produced. Moreover, it does not require a complicated measurement employing GPC, HPLC or the like during the production.

MODE FOR CARRYING OUT INVENTION

The polycarbonate resin of the present invention has a structural unit represented by general formula (1) below.

(1)

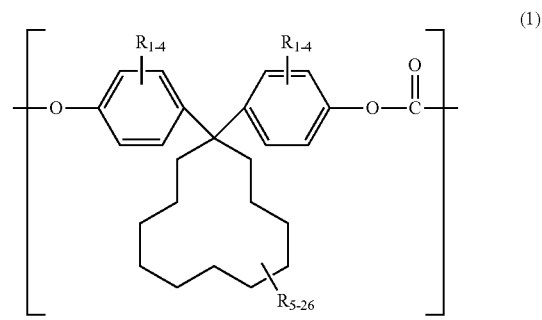

$R_{1-26}$ may identically or differently represent hydrogen, fluorine, chlorine, bromine, iodine, a C1-9 alkyl group, a C6-12 aryl group, a C1-5 alkoxy group, a C2-5 alkenyl group or a C7-17 aralkyl group. $R_{1-26}$ are preferably hydrogen.

While the polycarbonate resin of the present invention can be produced by employing a known method such as interfacial polymerization, transesterification or the like, it is preferably produced by interfacial polymerization. Hereinafter, interfacial polymerization will be described in detail as a preferable illustrative production method.

According to an interfacial polymerization method, a diol compound for inducing the structural unit represented by general formula (1) above is allowed to react with a carbonate precursor (preferably, phosgene) (Step 1), and thereafter interfacial polymerization is carried out in the presence of a molecular weight control agent (terminating agent) and a polymerization catalyst (Step 2) to give a polycarbonate resin.

(Step 1)

In Step 1, the diol compound for inducing the structural unit represented by general formula (1) is used as a raw monomer material of the polycarbonate resin. Specifically, the diol compound is represented by general formula (2) below.

(2)

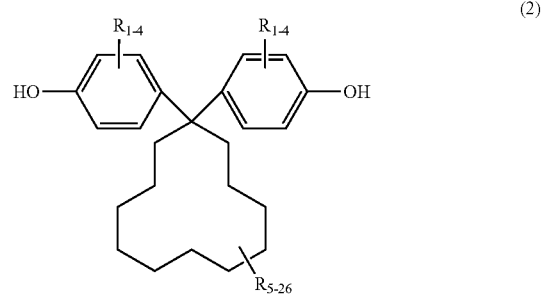

In general formula (2), $R_{1-26}$ represent the same as in general formula (1) above.

Examples of the diol compound represented by formula (2) include compounds such as:
1,1-bis(4-hydroxyphenyl)cyclododecane (sometimes referred to as cyclododecane bisphenol, HPCD),
1,1-bis(4-hydroxy-3-methylphenyl)cyclododecane,
1,1-bis(4-hydroxy-3-phenylphenyl)cyclododecane,
1,1-bis(4-hydroxy-3-t-butylphenyl)cyclododecane,
1,1-bis(4-hydroxy-3-sec-butylphenyl)cyclododecane,
1,1-bis(4-hydroxy-3-allylphenyl)cyclododecane,
1,1-bis(4-hydroxy-3,5-dimethylphenyl)cyclododecane,
1,1-bis(4-hydroxy-3-fluorophenyl)cyclododecane,
1,1-bis(4-hydroxy-3-chlorophenyl)cyclododecane,
1,1-bis(4-hydroxy-3-bromophenyl)cyclododecane,
7-ethyl-1,1-bis(4-hydroxyphenyl)cyclododecane, and
5,6-dimethyl-1,1-bis(4-hydroxyphenyl)cyclododecane.

If necessary, two or more of these can be used in combination. Among others, 1,1-bis(4-hydroxyphenyl)cyclododecane or 1,1-bis(4-hydroxy-3-methylphenyl)cyclododecane is particularly preferable.

In addition, as the raw materials, a diol compound other than the diol compound represented by formula (2) above may be used in combination with the diol compound represented by formula (2) as long as the resulting polycarbonate resin satisfies the requirements of the molecular weight distribution and the content of oligomers. In this case, the resulting polycarbonate resin will be a copolymerized polycarbonate. Specifically, examples of other diol compound include
4,4'-biphenyldiol,
bis(4-hydroxyphenyl)methane,
bis(4-hydroxyphenyl)ether,
bis(4-hydroxyphenyl)sulfone,
bis(4-hydroxy-3-methylphenyl)sulfone,
bis(4-hydroxyphenyl)sulfoxide,
bis(4-hydroxyphenyl)sulfide,
bis(4-hydroxyphenyl)ketone,
1,1-bis(4-hydroxyphenyl)ethane,
2,2-bis(4-hydroxyphenyl)propane (also referred to as bisphenol A, BPA),
2,2-bis(4-hydroxy-3-t-butylphenyl)propane,
2,2-bis(4-hydroxyphenyl)butane,
1,1-bis(4-hydroxyphenyl)cyclohexane,
2,2-bis(4-hydroxy-3-methylphenyl)propane (also referred to as bisphenol C, BPC),
2,2-bis(4-hydroxy-3,5-dimethylphenyl)propane,
1,1-bis(4-hydroxyphenyl)-1-phenylethane,
bis(4-hydroxyphenyl)diphenylmethane,
2,2-bis(4-hydroxy-3-allylphenyl)propane,
3,3,5-trimethyl-1,1-bis(4-hydroxyphenyl)cyclohexane,
1,1-bis(4-hydroxy-2-methyl-5-t-butylphenyl)-2-methylpropane,
9,9-bis(4-hydroxy-3-ethylphenyl)fluorene,
9,9-bis(4-hydroxy-3-methylphenyl)fluorene,
9,9-bis(4-hydroxyphenyl)fluorene,
α,ω-bis[3-(o-hydroxyphenyl)propyl]polydimethyldiphenyl random copolymer siloxane,
α,ω-bis[3-(o-hydroxyphenyl)propyl]polydimethylsiloxane,
4,4'-[1,4-phenylene bis(1-methyl ethylidene)]bisphenol,
4,4'-[1,3-phenylene bis(1-methyl ethylidene)]bisphenol.

If necessary, two or more of these can be used in combination. Among others, 2,2-bis(4-hydroxyphenyl)propane, 2,2-bis(4-hydroxy-3-methylphenyl)propane or 1,1-bis(4-hydroxyphenyl)cyclohexane is particularly preferable.

While it is preferable to selectively use a diol compound represented by general formula (2) above as the diol compound without using other diol compound for easier control of the molecular weight distribution, if diol compounds represented by formula (2) and other diol compound are to be used in combination, the diol compound represented by general formula (2) above is preferably used at 50 mol % or more, particularly 90 mol % or more with respect to the total diol compound.

As a specific procedure of Step 1, an aqueous solution obtained by mixing the above-described diol compound and an acid-binding agent in water is mixed with an inert organic solvent to prepare a mixture. Phosgene is blown into this mixture to obtain a reaction solution. The reaction solution after phosgene blowing contains prepolymers which are molecules smaller than the polycarbonate resin as the product of interest.

According to the present invention, the diol compound and the nitrogen-containing compound represented by general formula (3) below are mixed in Step 1. Preferably, the nitrogen-containing compound represented by general formula (3) below is mixed together when the diol compound and the acid-binding agent are mixed in water to obtain the aqueous solution. The nitrogen-containing compound serves as a phase-transfer catalyst.

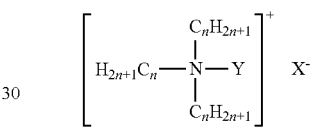

(3)

where, n represents any one of 2, 3 and 4. Y represents an ethyl group, a propyl group, a butyl group or a benzyl group. X represents Cl, Br, OH or $HSO_4$.

Specifically, examples of such a nitrogen-containing compound include benzyltriethylammonium chloride (TEBAC) and benzyltributylammonium chloride (TBBAC), where benzyltriethylammonium chloride (TEBAC) is favorable.

The amount of the nitrogen-containing compound represented by general formula (3) used is preferably small. Specifically, the amount is preferably less than 0.10 mass %, more preferably less than 0.05 mass % and particularly preferably less than 0.02 mass % with respect to the diol compound. This is because if the nitrogen-containing compound is used in an excessive amount, oligomers are more likely to be formed in the resulting polycarbonate resin as will be shown in Comparative examples 1 and 3 below, in which case it would be difficult to stably produce a polycarbonate resin of interest with less oligomers. While the reason is uncertain, the present inventors presumed that if the nitrogen-containing compound is present in an excessive amount, it acts like a terminating agent to promote formation of oligomers.

In order to ensure progress of the polymerization reaction, the lower limit of the amount of the nitrogen-containing compound used is preferably 0.001 mass % or more, more preferably 0.005 mass % or more and particularly preferably 0.01 mass % or more with respect to the diol compound.

The acid-binding agent may be, for example, pyridine or a hydroxide of an alkali metal such as sodium hydroxide and potassium hydroxide, where a hydroxide of an alkali metal is favorable. The mole ratio of the diol compound and the acid-binding agent in the aqueous solution is usually 1.0:1.8-12.0, preferably 1.0:2.0-10.0 and particularly preferably 1.0:2.0-8.5.

Preferably, the aqueous solution contains a small amount of antioxidant (for example, 0.05-3.0 mass % with respect to the diol compound) to prevent oxidation of the diol compound. Examples of the antioxidant include sodium sulfite and hydrosulfite.

The aqueous solution may also contain a small amount of branching agent (for example, 0.1-2.0 mass % with respect to the diol compound). Examples of the branching agent include phloroglucine and isatinbisphenol.

The inert organic solvent is one that dissolves phosgene as the raw material and the reaction products (oligomers, a polycarbonate resin and else) under the reaction conditions, but that is mutually insoluble in water. Examples of typical inert organic solvents include: aliphatic hydrocarbons such as hexane and n-heptane; chlorinated aliphatic hydrocarbons such as methylene chloride (also referred to as dichloromethane), chloroform, carbon tetrachloride, dichloroethane, trichloroethane, tetrachloroethane, dichloropropane and 1,2-dichloroethylene; aromatic hydrocarbons such as benzene, toluene and xylene;

chlorinated aromatic hydrocarbons such as chlorobenzene, o-dichlorobenzene and chlorotoluene; substituted aromatic hydrocarbons such as nitrobenzene and acetophenone; and so on. Among others, a chlorinated hydrocarbon, for example, methylene chloride or chlorobenzene can favorably be used.

The ratio of the organic phase to the water phase (volume ratio) is preferably 0.2-1.0.

When phosgene is blown into a mixture containing an inert solvent, the temperature of the mixture is preferably set to 80° C. or lower, in particular 70° C. or lower. If the reaction temperature is too high, side reactions are promoted, by which the phosgene unit is reduced. On the other hand, a lower reaction temperature is advantageous for controlling the reaction. If the temperature of the reaction system is to be lowered, however, cost for maintaining the temperature of the reaction system will increase since the reaction caused in Step 1 is a highly exothermic reaction. Considering these points, the most favorable temperature condition is 10-65° C.

While the reaction time depends on the conditions such as the reaction temperature, it is usually in a range of 0.5 minutes to 10 hours, and particularly preferably in a range of 1 minutes to 2 hours.

While the diol compound and phosgene may undergo continuous reaction in Step 1, it is more preferable to allow them to react in a batch mode.

(Step 2)

Subsequently, to the reaction solution containing the polycarbonate resin prepolymer obtained in Step 1, an organic solvent, a polymerization catalyst and a molecular weight control agent (terminating agent) are added to carry out interfacial polymerization.

According to the present invention, the organic solvent and the molecular weight control agent are first added to the reaction solution and the resultant is emulsified by stirring, then to which the polymerization catalyst is added. The time spent for emulsification by stirring (emulsification time) is preferably short. As will be described in Comparative example 2 below, if stirring takes too long, oligomers having a molecular weight of less than 1,000, which cause mold fouling upon injection molding, are more likely to be formed, and thus the molecular weight distribution of the resulting polycarbonate resin is likely to be wide.

While the reason why emulsification time affects the oligomer formation is uncertain, the present inventors consider as follows. Specifically, during emulsification without a polymerization catalyst, reaction between the polycarbonate resin prepolymer and the terminating agent progresses preferentially over the reaction between the polycarbonate resin prepolymers with each other that leads to polymerization. Therefore, the polymerization catalyst is preferably added immediately after quick stirring and emulsification sufficient to allow the terminating agent to disperse in the reaction solvent.

Specifically, the emulsification time is longer than 0 minute and shorter than 15 minutes, particularly preferably, 2-10 minutes.

While stirring can be carried out by a known technique, it is preferably reciprocating-rotary stirring. For example, it is preferable to use a reciprocating rotary stirring machine (AJITER). The stirring rate is preferably 30-150 cpm, and particularly preferably 60-120 cpm.

The organic solvent may be a known inert organic solvent exemplified in the description of Step 1. While the amount of the organic solvent added may suitably be determined, it is, for example, preferably such that the concentration of the prepolymer of the polycarbonate resin dissolved in the organic phase is 5-30 wt % when the reaction solution obtained in Step 1 is separated into a water phase and an organic phase.

Examples of the molecular weight control agent include monofunctional compounds such as phenol, p-t-butylphenol, p-cumylphenol and long-chain alkyl-substituted phenol. The amount of the molecular weight control agent used is usually 1 mole or more, preferably 2 moles or more, and usually 10 moles or less, preferably 5 moles or less relative to 100 moles of the diol compound.

The molecular weight control agent is preferably dissolved in the above-described organic solvent upon addition to the reaction solution.

From the viewpoint of maintaining the dispersed water phase in the continuous oil phase upon the interfacial polycondensation reaction, the ratio of the water phase to the organic phase (water phase/oil phase ratio (volume ratio)) in Step 2 is usually 0.05-2.00, preferably 0.1-1.5 and most preferably about 0.5-1.2. If the amount of water is too small, it would be difficult to control the temperature because of the heat generated upon polycondensation. If the amount of water is too large, it would be difficult to maintain the dispersed water phase upon stirring for polycondensation, and may have a risk of changing the condition of water phase dispersed in the organic phase to the condition of oil phase dispersed in water phase.

While the polymerization catalyst added to the emulsion may be any known catalyst, it is preferable to use a catalyst other than the nitrogen-containing compound represented by general formula (3) used in Step 1. For example, a tertiary amine such as triethylamine is preferably used. The amount of the polymerization catalyst used is usually 0.1 mass % or more, preferably 0.3 mass % or more, and usually 5 mass % or less, preferably 1 mass % or less with respect to the diol compound.

While the temperature upon the interfacial polycondensation reaction in Step 2 varies depending on the type of the materials used and so on, it is usually 0-35° C. and preferably controlled to be as low as 20° C. or lower, particularly 10° C. or lower from the viewpoint of controlling the molecular weight. While the reaction time may suitably be determined according to the conditions including the reaction temperature, it is preferably 10-60 minutes.

(Post-Polymerization Process)

Following Step 2, the resulting polymerization solution is separated into a water phase and an organic phase, and the organic phase is neutralized with an acid such as phosphoric acid and washed. The organic solvent is evaporated and distilled away from the generated polycarbonate resin solution to give a polycarbonate resin.

(Polycarbonate Resin)

The thus-obtained polycarbonate resin contains the structural unit represented by general formula (1) with very small amount of oligomers.

According to the present invention, oligomers refer to components having molecular weights of less than 1,000 in terms of polystyrene. While the lower limit of the molecular weight is not particularly limited, it is usually 100 or more. The components that are likely to attach to the mold as fouling upon injection molding were studied in detail, and the inventors found that, among the low-molecular weight components contained in the polycarbonate resin, oligomers having such molecular weights were particularly likely to volatilize upon injection molding and attach to the mold at a lower temperature to cause mold fouling. Therefore, suppressing the amount of such oligomers has significant meaning.

The content of oligomers having a molecular weight of less than 1,000 can be measured by a method illustrated in the following examples. Specifically, the polycarbonate resin is measured by gel permeation chromatography (GPC) and the log molecular weight is calculated using the following equation derived from polystyrene standards (for example, polystyrenes available from AMR Inc.). From the chromatogram having the molecular weight (log molecular weight) along the horizontal axis and the elution rate (dwt/d (log molecular weight)) along the vertical axis, the ratio of the area of the entire chromatograph and the area of the region of molecular weights of less than 1,000 is calculated to determine the content of oligomers having a molecular weight of less than 1,000.

$$\text{Log molecular weight} = s - 1.37T + 6.31 \times 10^{-2} \times T^2 - 1.35 \times 10^{-3} \times T^3$$

In the equation, T refers to elution time (min).

In the polycarbonate resin of the present invention, the content of oligomers is suppressed specifically to 0.50 mass % or less, preferably 0.40 mass % or less and particularly preferably 0.30 mass % or less. The lower limit of the content is very much close to zero, and may be a detection limit value, for example, 0.01 mass % or more, in particular 0.1 mass % or more.

In addition, the molecular weight distribution value (Mw/Mn) of the polycarbonate resin of the present invention is narrow. Specifically, it is 6.0 or less, preferably less than 6.0, more preferably 5.5 or less and particularly preferably 5.0 or less. The lower limit of the molecular weight distribution value is close to 1.0, for example, 1.3. Such a narrow molecular weight distribution value indicates that the lengths of the polymer molecules in the polycarbonate resin of the present invention are uniform and there is no substance that is volatilized upon melt molding, and thus the polycarbonate resin exhibits excellent low sublimation property upon melt molding.

The molecular weight of the polycarbonate resin of the present invention is, preferably 20,000-200,000 and particularly preferably 60,000-170,000 in a weight average molecular weight (Mw) considering the property adaptable to injection molding. If the weight average molecular weight of the polycarbonate resin is increased, the molecules are generally difficult to grow uniformly, as a result of which the amount of oligomers is increased. According to the present invention, however, the amount of oligomers can be suppressed even when a polycarbonate resin having a large weight average molecular weight is to be produced. From this point of view, the weight average molecular weight is most preferably 100,000-170,000.

The weight average molecular weight (Mw) and the molecular weight distribution value (Mw/Mn) can be calculated by measurement by gel permeation chromatography and calibration in terms of polystyrenes.

Just like the conventional polycarbonate resins, the polycarbonate resin of the present invention characterized as described above can be fabricated into various molded articles by injection molding, extrusion molding or the like. In particular, it is favorable for application to injection molding.

Examples of such fabricated products include materials such as a film, thread and a plate, as well as parts of a lighting apparatus, parts of an optical device, and a substrate of an optical disc or a magneto-optical disc. These molded articles can also be produced using a composition obtained by adding a stabilizer, a mold release agent, a flame retardant, an antistatic agent, a filler, fiber, an impact strength modifier or the like to the polycarbonate resin by a common method.

EXAMPLES

Hereinafter, the present invention will be described in more detail by way of examples, although the present invention should not be limited to the following examples.

<Conditions for measurement by gel permeation chromatography (GPC)>

The weight average molecular weight (Mw), the molecular weight distribution value (Mw/Mn) (in terms of polystyrene) and the content (mass %) of oligomers having a molecular weight of less than 1,000 in each of the polycarbonate resins obtained in the examples and the comparative examples were measured under the following conditions.

Measurement instrument: HLC-8320GPC from Tosoh Corporation

Columns: Shodex K-G+K-805L×2+K-800D

Eluent: Chloroform

Temperature: Thermostatic tank for columns at 40° C.

Flow rate: 1.0 ml/min

Concentration: 0.1 wt/vol %

Injected amount: 100 µl

Pretreatment: Filtration with 0.45 µm filter

Detector: Refractive index detector (RI)

The content (mass %) of oligomers having a molecular weight of less than 1,000 was determined as follows. Specifically, polystyrenes available from AMR Inc. were used to generate the following calibration curve equation, which was used to calculate the log molecular weight.

$$\text{Log molecular weight} = s - 1.37T + 6.31 \times 10 - 2 \times T^2 - 1.35 \times 10^{-3} \times T^3$$

where, T represents elution time (min).

From the chromatogram having the molecular weight (log molecular weight) along the horizontal axis and the elution rate (dwt/d (log molecular weight)) along the vertical axis, the ratio of the area of the entire chromatograph and the area of the region of molecular weights of less than 1,000 was calculated to determine the content of oligomers having a molecular weight of less than 1,000.

Example 1

(Step 1)

To 1,050 ml of a 9 w/w % aqueous solution of sodium hydroxide, 100 g of cyclododecane bisphenol (hereinafter, HPCD) from Honshu Chemical Industry Co., Ltd., 0.5 g of hydrosulfite and 0.01 g of benzyltriethylammonium chloride (hereinafter, TEBAC) were added to be dissolved therein. To the resulting solution, 390 ml of dichloromethane was added, and 45 g of phosgene was blown into the resultant by spending 30 minutes while stirring and setting the solution temperature to 20° C.

(Step 2)

After the phosgene blowing, 0.5 g of p-tert-butylphenol (PTBP) dissolved in 50 ml of dichloromethane was added and vigorously stirred for 7 minutes for emulsification (emulsification time was 7 minutes). Thereafter, 0.36 g of triethylamine (TEA) was added as a polymerization catalyst to allow polymerization for 30 minutes.

(Post-Polymerization Process)

The polymerization solution was separated into a water phase and an organic phase, and the organic phase was neutralized with phosphoric acid and repeatedly washed with pure water until pH of the water after washing became pH=7.0. The organic solvent was evaporated and distilled away from the generated polycarbonate resin solution to give polycarbonate resin powder.

The resulting polycarbonate resin powder was subjected to an analytical measurement by GPC. As a result, Mw was 155,300, the molecular weight distribution value (Mw/Mn) was 4.16, and the content of oligomers having a molecular weight of less than 1,000 was 0.24 mass %.

Example 2

Polycarbonate resin powder was obtained in the same manner as Example 1 except that the emulsification time was changed to 2 minutes in Step 2.

The resulting polycarbonate resin powder was subjected to an analytical measurement by GPC. As a result, Mw was 157,500, the molecular weight distribution value (Mw/Mn) was 4.16, and the content of oligomers having a molecular weight of less than 1,000 was 0.35 mass %.

Example 3

Polycarbonate resin powder was obtained in the same manner as Example 1 except that TEBAC was changed to benzyltributylammonium chloride (TBBAC) in Step 1.

The resulting polycarbonate resin powder was subjected to an analytical measurement by GPC. As a result, Mw was 159,300, the molecular weight distribution value (Mw/Mn) was 4.94, and the content of oligomers having a molecular weight of less than 1,000 was 0.27 mass %.

Example 4

Polycarbonate resin powder was obtained in the same manner as Example 1 except that the amount of TEBAC added was changed to 0.05 g in Step 1.

The resulting polycarbonate resin powder was subjected to an analytical measurement by GPC. As a result, Mw was 155,500, the molecular weight distribution value (Mw/Mn) was 5.82, and the content of oligomers having a molecular weight of less than 1,000 was 0.45 mass %.

Example 5

Polycarbonate resin powder was obtained in the same manner as Example 1 except that emulsification time was changed to 10 minutes in Step 2.

The resulting polycarbonate resin powder was subjected to an analytical measurement by GPC. As a result, Mw was 157,600, the molecular weight distribution value (Mw/Mn) was 4.81, and the content of oligomers having a molecular weight of less than 1,000 was 0.34 mass %.

Example 6

Polycarbonate resin powder was obtained in the same manner as Example 1 except that 70 g of HPCD and 30 g of bisphenol A (BPA) were used as the diol compound and the amount of PTBP was changed to 1.4 g in Step 1.

The resulting polycarbonate resin powder was subjected to an analytical measurement by GPC. As a result, Mw was 71,800, the molecular weight distribution value (Mw/Mn) was 2.47, and the content of oligomers having a molecular weight of less than 1,000 was 0.15 mass %.

Example 7

Polycarbonate resin powder was obtained in the same manner as Example 1 except that 50 g of HPCD and 50 g of BPA were used as the diol compound and the amount of PTBP was changed to 1.53 g in Step 1.

The resulting polycarbonate resin powder was subjected to an analytical measurement by GPC. As a result, Mw was 70,000, the molecular weight distribution value (Mw/Mn) was 2.46, and the content of oligomers having a molecular weight of less than 1,000 was 0.16 mass %.

Example 8

Polycarbonate resin powder was obtained in the same manner as Example 1 except that 30 g of HPCD and 70 g of BPA were used as the diol compound and the amount of PTBP was changed to 1.65 g in Step 1.

The resulting polycarbonate resin powder was subjected to an analytical measurement by GPC. As a result, Mw was 75,500, the molecular weight distribution value (Mw/Mn) was 2.64, and the content of oligomers having a molecular weight of less than 1,000 was 0.21 mass %.

Comparative Example 1

Polycarbonate resin powder was obtained in the same manner as Example 1 except that the amount of TEBAC added was changed to 0.20 g in Step 1.

The resulting polycarbonate resin powder was subjected to an analytical measurement by GPC. As a result, Mw was 177,800, the molecular weight distribution value (Mw/Mn) was 7.44, and the content of oligomers having a molecular weight of less than 1,000 was 0.80 mass %.

Comparative Example 2

Polycarbonate resin powder was obtained in the same manner as Example 1 except that the emulsification time was changed to 15 minutes in Step 2.

The resulting polycarbonate resin powder was subjected to an analytical measurement by GPC. As a result, Mw was 160,500, the molecular weight distribution value (Mw/Mn)

was 6.03, and the content of oligomers having a molecular weight of less than 1,000 was 0.68 mass %.

Comparative Example 3

Polycarbonate resin powder was obtained in the same manner as Example 1 except that the amount of TBBAC added was changed to 0.10 g, in other words, 0.10 g of TBBAC was added instead of 0.01 g of TEBAC, in Step 1.

The resulting polycarbonate resin powder was subjected to an analytical measurement by GPC. As a result, Mw was 153,300, the molecular weight distribution value (Mw/Mn) was 6.12, and the content of oligomers having a molecular weight of 1,000 or less was 0.54 mass %.

Comparative Example 4

(Step 1)
To 1,050 ml of a 9 w/w % aqueous solution of sodium hydroxide, 100 g of HPCD and 0.5 g of hydrosulfite were added to be dissolved therein. To the resulting solution, 390 ml of dichloromethane was added, and 45 g of phosgene was blown into the resultant by spending 30 minutes while stirring and setting the solution temperature to 20° C.

(Step 2)
After the phosgene blowing, the resultant was vigorously stirred for 7 minutes for emulsification (emulsification time was 7 minutes). Thereafter, 0.007 g of pyridine hydrochloride was added as a polymerization catalyst to allow polymerization for 30 minutes.

The resulting polycarbonate resin powder was subjected to an analytical measurement by GPC. As a result, Mw was 23,400, the molecular weight distribution value (Mw/Mn) was 2.63, and the content of oligomers having a molecular weight of 1,000 or less was 1.30 mass %.

Comparative Example 5

(Step 1)
To 1,050 ml of a 9 w/w % aqueous solution of sodium hydroxide, 100 g of HPCD and 0.5 g of hydrosulfite were added to be dissolved therein. To the resulting solution, 390 ml of dichloromethane was added, and 45 g of phosgene was blown into the resultant by spending 30 minutes while stirring and setting the solution temperature to 20° C.

(Step 2)
After the phosgene blowing, 0.005 g of triethylamine was added as a polymerization catalyst and the resultant was stirred for 15 minutes. Thereafter, 0.5 g of PTBP dissolved in 50 ml of dichloromethane was added.

The resulting polycarbonate resin powder was subjected to an analytical measurement by GPC. As a result, Mw was 26,900, the molecular weight distribution value (Mw/Mn) was 2.43, and the content of oligomers having a molecular weight of 1,000 or less was 0.63 mass %. However, the chloroformate structure remained and polymerization was incomplete.

Comparative Example 6

Polycarbonate resin powder was obtained in the same manner as Example 1 except that the amount of TEBAC added was changed to 0.10 g in Step 1.

The resulting polycarbonate resin powder was subjected to an analytical measurement by GPC. As a result, Mw was 165.800, the molecular weight distribution value (Mw/Mn) was 5.74, and the content of oligomers having a molecular weight of less than 1,000 was 0.60 mass %.

Comparative Example 7

Polycarbonate resin powder was obtained in the same manner as Example 1 except that HPCD was changed to BPC, the amount of TEBAC was changed to 0.02 g and the amount of PTBP was changed to 1.4 g in Step 1.

The resulting polycarbonate resin powder was subjected to an analytical measurement by GPC. As a result, Mw was 74,500, the molecular weight distribution value (Mw/Mn) was 3.19, and the content of oligomers having a molecular weight of less than 1,000 was 0.68 mass %.

The results from Examples 1-8 and Comparative examples 1-7 are shown in Table 1.

TABLE 1

| | Diol compound | | Nitrogen-containing compound | | Percentage relative to diol compound (mass %) | Emulsification time (min) | Mw | Molecular weight distribution (Mw/Mn) | Content of oligomers having molecular weight of less than 1,000 (mass %) | Notes |
|---|---|---|---|---|---|---|---|---|---|---|
| | Kind | Mass (g) | Kind | Mass (g) | | | | | | |
| Example 1 | HPCD | 100 | TEBAC | 0.01 | 0.01 | 7 | 155,300 | 4.16 | 0.24 | — |
| Example 2 | HPCD | 100 | TEBAC | 0.01 | 0.01 | 2 | 157,500 | 4.16 | 0.35 | — |
| Example 3 | HPCD | 100 | TBBAC | 0.01 | 0.01 | 7 | 159,300 | 4.94 | 0.27 | — |
| Example 4 | HPCD | 100 | TEBAC | 0.05 | 0.05 | 7 | 155,500 | 5.82 | 0.45 | — |
| Example 5 | HPCD | 100 | TEBAC | 0.01 | 0.01 | 10 | 157,600 | 4.81 | 0.34 | — |
| Example 6 | HPCD BPA | 70 30 | TEBAC | 0.01 | 0.01 | 7 | 71,800 | 2.47 | 0.15 | — |
| Example 7 | HPCD BPA | 50 50 | TEBAC | 0.01 | 0.01 | 7 | 70,000 | 2.46 | 0.16 | — |
| Example 8 | HPCD BPA | 30 70 | TEBAC | 0.01 | 0.01 | 7 | 75,500 | 2.64 | 0.21 | — |
| Comparative example 1 | HPCD | 100 | TEBAC | 0.20 | 0.20 | 7 | 177,800 | 7.44 | 0.80 | — |
| Comparative example 2 | HPCD | 100 | TEBAC | 0.01 | 0.01 | 15 | 160,500 | 6.03 | 0.68 | — |
| Comparative example 3 | HPCD | 100 | TBBAC | 0.10 | 0.10 | 7 | 153,300 | 6.12 | 0.54 | — |

TABLE 1-continued

| | Diol compound | | Nitrogen-containing compound | | | Emulsification time (min) | Mw | Molecular weight distribution (Mw/Mn) | Content of oligomers having molecular weight of less than 1,000 (mass %) | Notes |
|---|---|---|---|---|---|---|---|---|---|---|
| | Kind | Mass (g) | Kind | Mass (g) | Percentage relative to diol compound (mass %) | | | | | |
| Comparative example 4 | HPCD | 100 | None | 0 | — | 7 | 23,400 | 2.63 | 1.30 | 0.007 g pyridine hydrochloride used instead of TEA |
| Comparative example 5 | HPCD | 100 | None | 0 | — | 0 | 26,900 | 2.43 | 0.63 | After feeding 0.005 g TEA, the resultant was stirred for 15 minutes, and PTBP was fed to the resultant. Significant amount of terminal chloroformate structures |
| Comparative example 6 | HPCD | 100 | TEBAC | 0.10 | 0.10 | 7 | 165,800 | 5.74 | 0.60 | — |
| Comparative example 7 | BPC | 100 | TEBAC | 0.02 | 0.02 | 7 | 74,500 | 3.19 | 0.68 | — |

HPCD: Cyclododecane bisphenol
BPA: Bisphenol A
BPC: Bisphenol C
TEBAC: Benzyltriethylammonium chloride
TBBAC: Benzyltributylammonium chloride

The invention claimed is:

1. A method for producing a polycarbonate resin comprising a structural unit represented by general formula (1) below, wherein a molecular weight distribution value (Mw/Mn) is 6.0 or less and a content of oligomers having a molecular weight of less than 1,000 is 0.50 mass % or less:

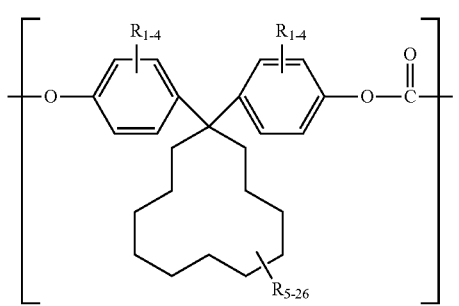

(1)

where, $R_{1-26}$ represent hydrogen, fluorine, chlorine, bromine, iodine, a C1-9 alkyl group, a C6-12 aryl group, a C1-5 alkoxy group, a C2-5 alkenyl group or a C7-17 aralkyl group, wherein the method comprises:

a step of mixing a diol compound represented by general formula (2) below and a nitrogen-containing compound represented by general formula (3) below in an amount of less than 0.10 mass % relative to the diol compound,

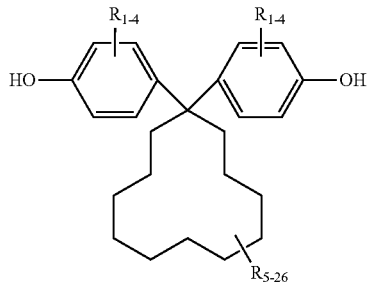

(2)

where, $R_{1-26}$ represent the same as in the general formula (1),

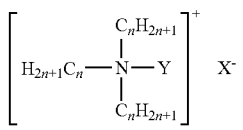

(3)

where, n represents any one of 2, 3 and 4, Y represents an ethyl group, a propyl group, a butyl group or a benzyl group, and X represents Cl, Br, OH or $HSO_4$; and adding an organic solvent and a molecular weight control agent to a reaction solution containing the diol compound, the nitrogen-containing compound and phosgene, and emulsifying the resulting solution for a time shorter than 15 minutes.

2. The method according to claim 1, wherein $R_{1-26}$ in the general formula (1) are hydrogen.

* * * * *